United States Patent

Hahn et al.

[15] 3,681,808
[45] Aug. 8, 1972

[54] CROWFOOT-TYPE DRAG ROPE SOCKET ASSEMBLY

[72] Inventors: Frederick C. Hahn, Beaverton; Edward B. Czyzewski, Aloha, both of Oreg.

[73] Assignee: Esco Corporation, Portland, Oreg.

[22] Filed: March 30, 1971

[21] Appl. No.: 129,400

[52] U.S. Cl. ...............24/126 K, 287/100, 37/135, 24/126 R
[51] Int. Cl. .....................F16g 11/04, F16g 11/12
[58] Field of Search .........37/135; 24/126 K, 136 K; 287/100

[56] References Cited

UNITED STATES PATENTS

| | | | |
|---|---|---|---|
| 1,379,311 | 5/1921 | Page | 24/126 K |
| 1,443,014 | 1/1923 | Edwards | 281/100 |

Primary Examiner—Bernard A. Gelak
Attorney—Dawson, Tilton, Fallon & Lungmus

[57] ABSTRACT

A crowfoot socket for a drag line bucket having square-headed pins angularly related in shank end abutting relation to provide pivot connections for the drag chains and dump rope associated with the bucket.

4 Claims, 3 Drawing Figures

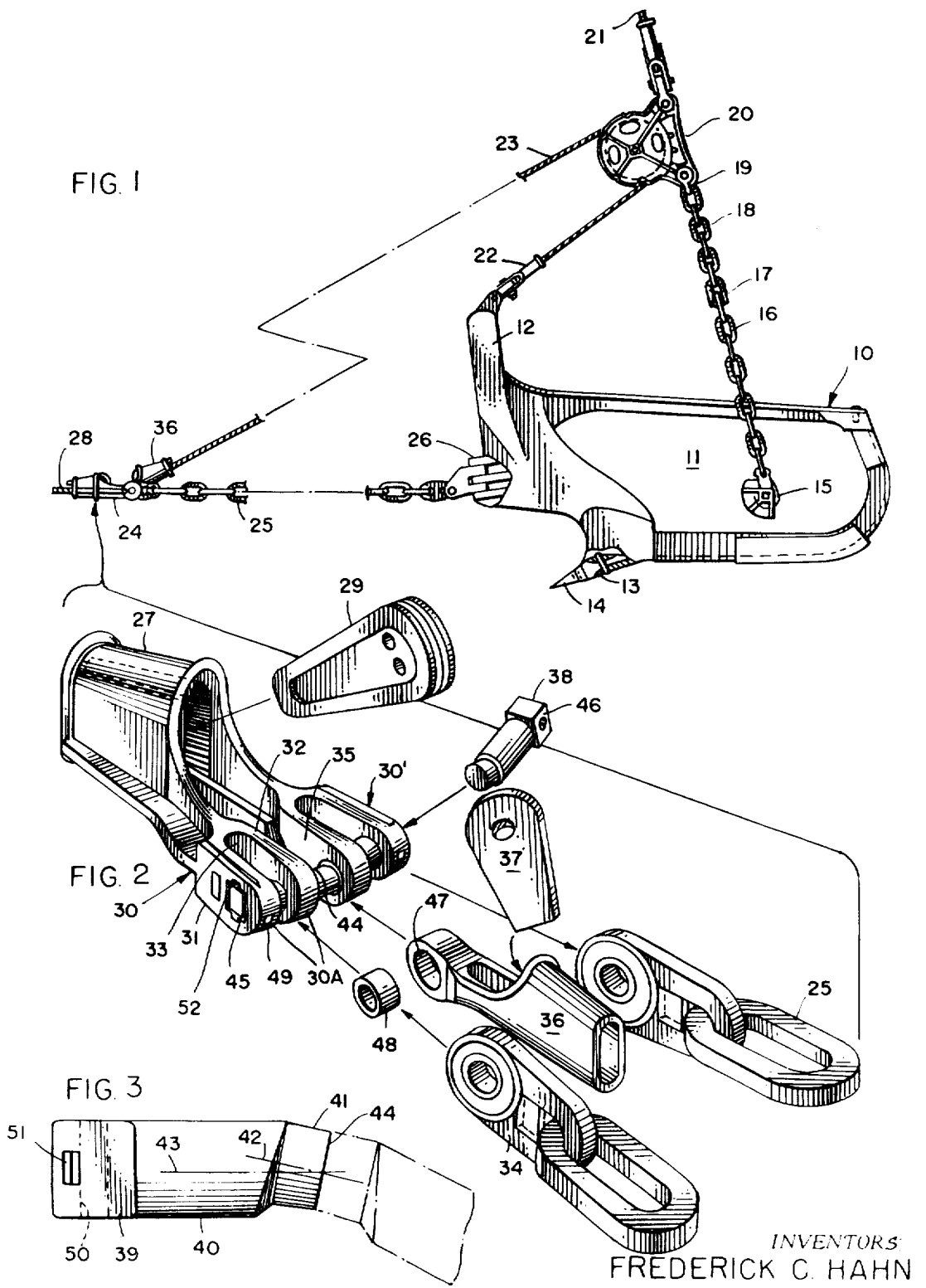

CROWFOOT-TYPE DRAG ROPE SOCKET ASSEMBLY

BACKGROUND AND SUMMARY OF THE INVENTION

In the past, crowfoot assemblies have been employed, but almost exclusively, with a straight-through pin. In a few instances, angled pins have been employed, but without particular advantage. In the instant arrangement, the angled pins are each equipped with polygonal heads which fit into correspondingly shaped bores in the outer legs of the crowfoot assembly. These eliminate any tendency of the pins to rotate, and, more importantly, constitute a firm bearing so as to stabilize the pin against displacement, undue stress, etc., resulting from the application of stress by the drag chains.

The invention is described in conjunction with an illustrative embodiment in the accompanying drawing, in which:

FIG. 1 is a side elevational view, partially broken away, showing a drag line bucket equipped with the inventive crowfoot assembly;

FIG. 2 is an enlarged perspective exploded view of the crowfoot assembly according to the invention; and FIG. 3 is a side elevational view of a pin employed in the assembly, with the companion pin being shown in fragmentary phantom line.

In the illustration given, and with reference to FIG. 1, the numeral 10 generally designates a drag line bucket which is seen to have a body 11 and an arch 12. The lip 13 is equipped with a plurality of forwardly projecting excavating teeth 14.

The sides of the bucket 10 are equipped with trunnions 15 to which lower hoist chains 16 are connected. It will be appreciated that the lower hoist chains extend upwardly and somewhat outwardly, being connected to a generally horizontally extending (in the posture shown) spreader bar 17. Hoisting of the bucket is achieved through the lower hoist chains and the upper hoist chains 18 which extend upwardly and inwardly into a hoist shackle 19. The shackle 19, in turn, is pivotally connected to a dump block 20. The dump block is connected to the hoist rope 21 through a socket arrangement.

Connected to the arch 12 is an upper dump rope socket 22 which constitutes one end of a dump rope 23. The other end of the dump rope 23 is connected to the crowfoot assembly generally designated 24, which will be explained in greater detail hereinafter.

Movement of the bucket 10 along the ground is achieved through the drag chain 25 which is connected to a hitch plate 26 provided as part of the bucket. The other end, i.e., the forward end, of the drag chain 25 is operably connected to the crowfoot assembly 24. It will be appreciated that two drag chains are provided, one connected to each side of the bucket 10.

The crowfoot assembly 24 can be seen in exploded detail in FIG. 2, and includes a bowl 27 which is employed for interconnecting a drag rope 28 (see FIG. 1) with the drag chains 25 and the dump rope 23.

The leading (i.e., forward) end of the fitting bowl 27 is in the form of a tubular sleeve. This is shaped to receive a drag rope socket wedge 29 over which the drag rope 28 is reeved. For this purpose, the tubular fitting bowl 27 is tapered in the forward direction.

The fitting bowl 27 adjacent its rear end is equipped with two pairs of longitudinally projecting integral spaced-apart legs, one pair being generally designated 30 and the other pair generally designated 30'. The legs are disposed in side-by-side relation, with the legs in each pair being parallel to each other; for example, the pair of legs designated 30' includes an outer leg 31 and an inner leg 32.

The space 33 between the legs of each pair (i.e., between the legs 31 and 32 of the pair 30) is adapted to receive a link 34 of one of the drag chains 25. It will be seen in FIG. 2 that the same relationship exists between the other drag chain 25 and the other pair of legs generally designated 30'.

The space 35 between the two pairs of legs is adapted to receive a dump rope socket 36. The shape of the dump rope socket 36 is generally tubular and tapered rearwardly so as to receive a dump rope socket wedge 37 to provide the connection illustrated in FIG. 1.

The two pairs of legs 30 and 30' are generally divergent in proceeding toward the rear end of the fitting 27. In the illustration given, each pair is arranged at an angle of about 10° relative to the longitudinal center line of the fitting 27, i.e., the angle between the center lines of the pairs 30 and 30' is 20°. Each of the legs 31 and 32 of each pair 30 and 30' is equipped with a bore for the receipt of a pair of pins. According to the invention, two square-headed angle shanked pins are employed as can be appreciated from the phantom showing generally designated 38 in FIG. 2 and the side elevational view in FIG. 3. Each pin 38 has a square head 39 (see FIG. 3) and a shank portion immediately adjacent thereto which is cylindrical. The extreme end of the shank is also cylindrical, as at 41, but has an axis 42 which is disposed at an angle to the axis 43 of the shank portion 40. Each pin 38 is equipped with a flat shank end face 44 which is perpendicular to the axis 42, and the abutting contact of the two faces 44 can be appreciated from the showing of the lower right hand end of the fitting 27 in FIG. 2. It is possible to make the heads 39 of the pins 38 polygonal shapes other than square, but we find it advantageous to make the head square along with the corresponding bore 45 (see FIG. 2) in the outer leg 31 so as to orient the side 46 of the square closest to the end of the outer leg generally perpendicular to the line of force application resulting from the associated drag chain 25.

The cylindrical shank end portions 41 are of reduced diameter relative to the shank portion 40, and constitute a pivot bearing for the rearward end of the dump rope socket 36. For this purpose, the dump rope socket 36 is equipped with a cylindrical bore 47 which receives a bushing 48. The bushing 48 receives the reduced shank ends 41 which provide a suitable pivot bearing.

For maintaining the pins 38 within the transverse bores in the legs 31 and 32, we provide a locking pin 49 which extends through an aligned transverse bore 50 (see FIG. 3) in the pin 38. Additionally, the pin head 39 is equipped with recesses 51 which may be employed for prying removal of the pin when necessary. To facilitate this, we have provided corresponding tapered recesses 52 in the outboard face of each outer leg 31.

In the operation of the device, the crowfoot assembly 24 is installed in the fashion indicated in FIG. 1. Lines of forces that are applied to the assembly 24 are coincident with the two drag chains 25, the dump rope 23, and the drag rope 28. By virtue of arranging the pins and legs as illustrated and described, we insure that the pins are perpendicular to the lines of pull. This gives full bearing for wear and reduced stresses compared to conventional designs where the pin is out of planar relation with the end link, thereby creating a line contact bearing. Also, the angled shank ends of the pins make possible a straight line pull bearing for the dump socket 36. The polygonal head (shown square herein) on the pin prevents the pin from turning, which would cause shear on the lock bolt and which would lead to loss of pins. Also, the head of the pin arrangement provides more bearing in the extreme outboard area where the loads from the machine and bucket system are the highest.

I claim:

1. A crowfoot type drag rope socket assembly for interconnecting a drag rope with a drag chain and a dump rope, the latter being connected to a drag line bucket, comprising a relatively elongated unitary fitting having a first end adapted to be connected to a drag rope, said fitting adjacent said one end being tubular and tapered in proceeding toward said first end and adapted to receive a drag rope socket wedge over which said drag rope is reevable, said fitting adjacent the other end having two pairs of integral longitudinally projecting spaced apart legs disposed in side-by-side relation with the legs in each pair being parallel, the space between the legs in each pair being adapted to receive a link of a drag chain, the space between the pairs of legs being adapted to receive a dump rope socket, said pair of legs being generally divergent in proceeding toward said other end, said legs being equipped with transverse bores extending transversely to the length of said legs, the bore in each of the outer legs of each pair being polygonal, a relatively elongated pin for each pair of legs mounted in the bores thereof and having a polygonal shaped head received in the associated outer leg bore, each pin having a shank terminating in an integral cylindrical section having an axis disposed in angular relation to the axis of the remainder of said pin whereby said pins are adapted to abut at their shank ends to provide a pivot mounting for said dump rope, and means interconnecting each pin head and said fitting to retain said pins in place.

2. The assembly of claim 1 in which said polygonal shape of said head and outer leg bore is a square oriented with the one side of said square closest to the end of said outer leg being generally perpendicular to the line of force application by said drag chain to said pin.

3. The assembly of claim 2 in which said outer leg has a second bore communicating with the pin head receiving bore thereof, said one side of said head being equipped with an opening, a removable pin extending through said second bore into said opening, said outer leg adjacent a side of square bore being equipped with a relief to facilitate removal of said pin by prying.

4. The assembly of claim 1 in which said pin has a first shank portion immediately adjacent said head, said first shank portion being cylindrical, said integral cylindrical section being spaced from said head and having a diameter less than the diameter of said first shank section.

* * * * *